March 31, 1931.  C. A. BLUHM  1,799,082
VEHICLE SPRING
Filed March 17, 1928   2 Sheets-Sheet 1
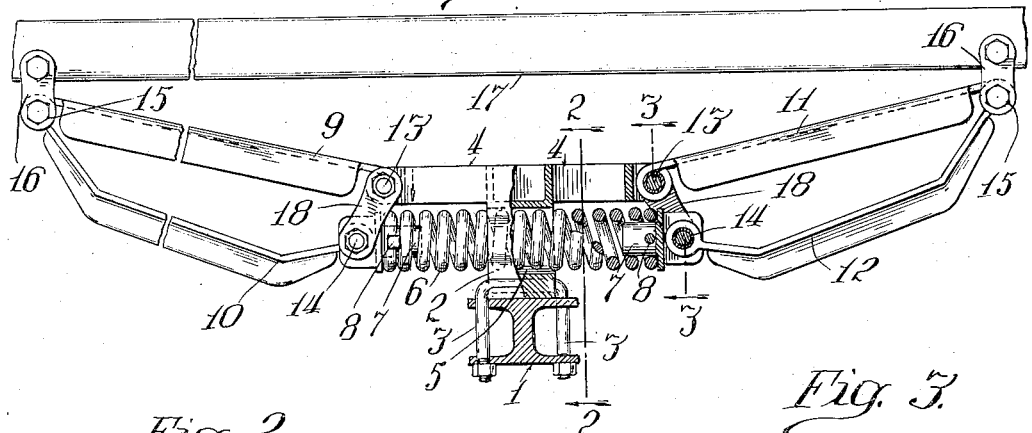
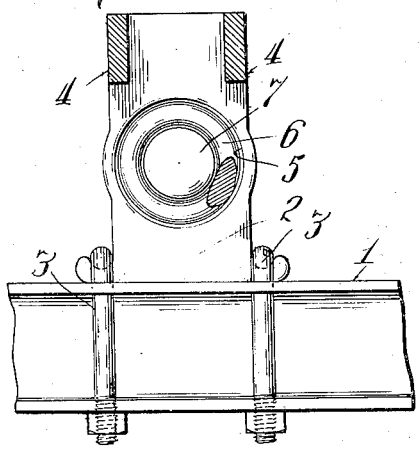
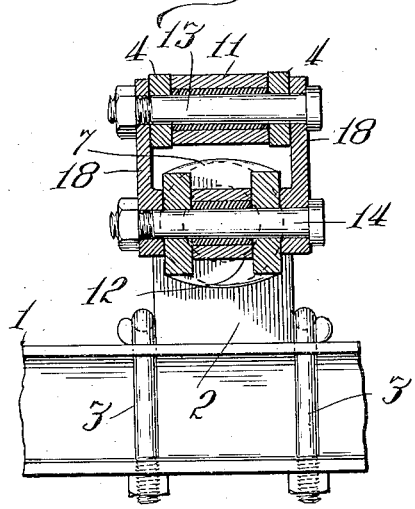
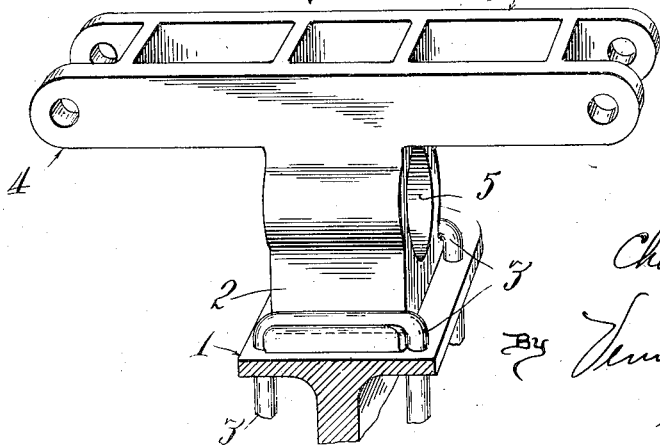
Inventor
Charles A. Bluhm
By Vernon E. Hodges
his Attorney.

March 31, 1931. C. A. BLUHM 1,799,082
VEHICLE SPRING
Filed March 17, 1928 2 Sheets-Sheet 2
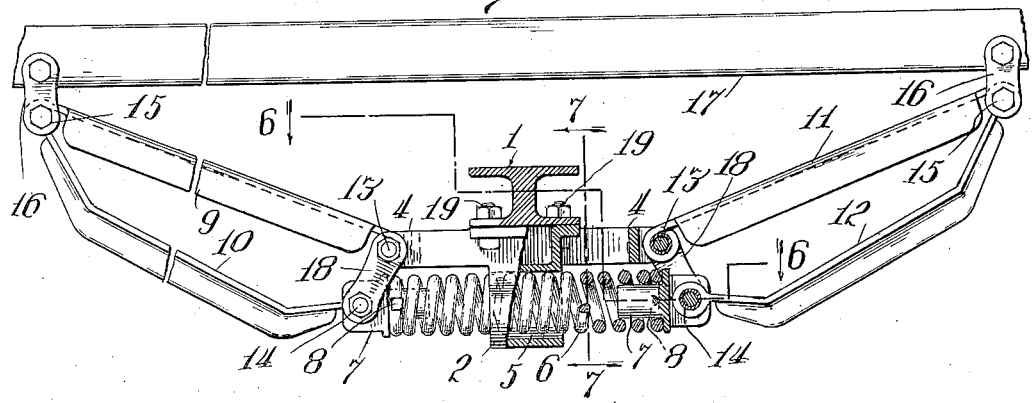
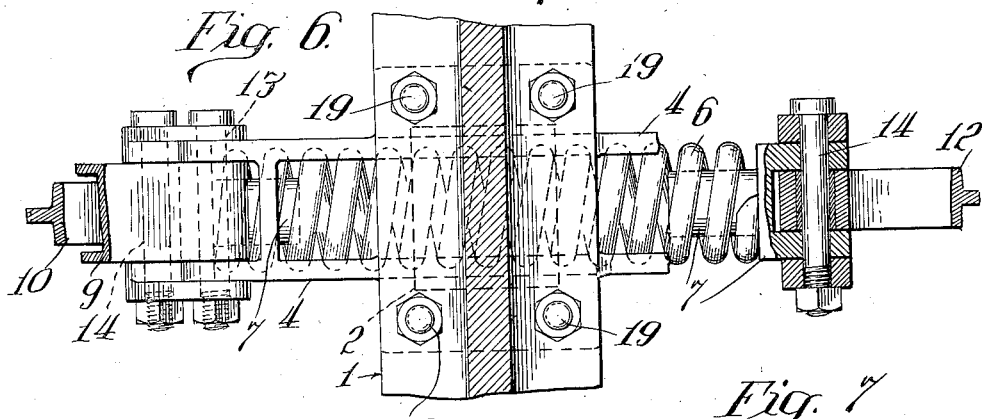
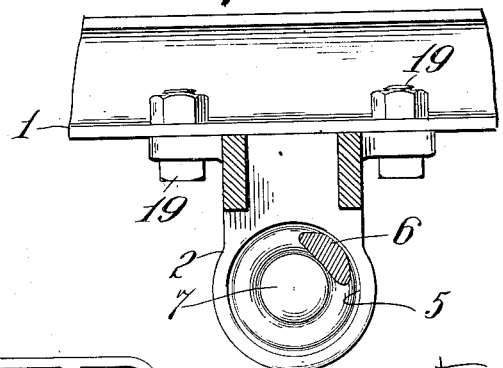
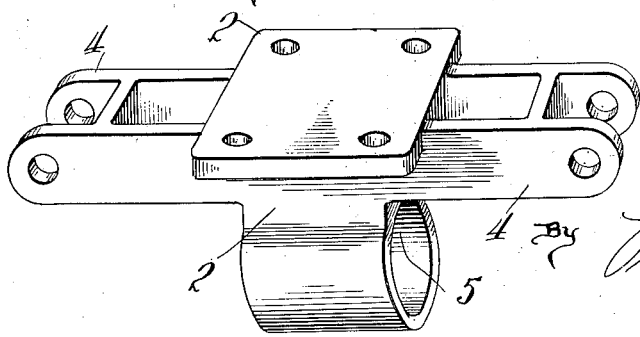
Inventor
Charles A. Bluhm
By Vernon E. Hodge
his Attorney.

Patented Mar. 31, 1931

1,799,082

UNITED STATES PATENT OFFICE

CHARLES A. BLUHM, OF MICHIGAN CITY, INDIANA

VEHICLE SPRING

Application filed March 17, 1928. Serial No. 262,376.

This invention relates to an improvement in vehicle springs.

The object of the invention is to provide a vehicle spring that is not subject to breakage as is true of the springs generally in use. This objection is overcome by using a coil spring extending through a housing which is connected to the axle of the vehicle and to the chassis by interposing levers therebetween to form a connection between the housing and the ends of the spring and the chassis. The front set of levers is shorter than the rear levers, which makes a differential in their movement up and down, whenever compression is placed on the levers by the weight of the chassis. This compression action of the coil spring and the differential in the levers automatically absorbs the shock imparted to the vehicle. The spring device may be mounted either above or below the axle without materially changing the structure except for the substitution of a different form of housing.

In the accompanying drawings:

Fig. 1 is a side elevation partly in section of the vehicle spring as applied;

Fig. 2 is a transverse sectional view taken on the line 2—2 of Fig. 1;

Fig. 3 is a similar view on the line 3—3 of Fig. 1;

Fig. 4 is a detached perspective view of the housing;

Fig. 5 is a side elevation partly in section, showing the invention applied beneath the axle;

Fig. 6 is a sectional view on the line 6—6 of Fig. 5;

Fig. 7 is a similar view on the line 7—7 of Fig. 5; and

Fig. 8 is a detached perspective view of the bottom housing.

The numeral 1 indicates the axle of the vehicle upon which the housing 2 is secured by saddle bolts 3, in the form shown in Figs. 1 to 4. The housing 2 is provided with extensions 4 extending outwardly in opposite directions therefrom. The housing is also provided with a central opening 5, through which a coil spring 6 extends having its opposite ends abutting against and receiving compression heads 7, being secured thereto by the bolts 8.

The front and rear levers 9, 10, and 11, 12, respectively, extend in opposite directions from the extensions 4 and compression heads 7 being secured thereto by the bolts 13 and 14, and these levers have their outer ends secured to hanger bolts 15 suspended by hangers 16 from the chassis frame 17.

Similar hangers 18 extend between and are connected with the bolts 13 and 14, which thereby support the compression heads and the outer ends of the spring from the outer ends of the extensions 4. The hangers 18 together with the compression heads 7 hold the coil spring 6 in proper alignment when compression is applied to the compression heads by the levers 9, 10, and 11, 12. The front levers 9 and 10 are shorter in length than the rear levers 11 and 12, which makes a differential in their up and down movement when compression is brought to bear upon the levers by the weight of the chassis, which cooperates with the coil spring to automatically absorb the shock imparted to the vehicle from the axle.

The modified arrangement shown in Figs. 5 to 8 inclusive is similar to that of Figs. 1 to 4 except that the housing 2 has the securing plate formed on the upper surface thereof for attachment beneath the axle 1 by the usual bolts 19. Otherwise the construction is the same as well as the operation. Because of this, the vehicle spring is capable of being mounted either above or below the axle as may be desired, merely by a changing of the housing, all of the other parts of the construction being the same.

I claim:—

1. In a vehicle spring, the combination with vehicle members movable relative to each other, of a resilient spring associated with one of said members, and front and back levers connecting the ends of said spring with the other member, the front levers being relatively shorter in length than the back levers.

2. In a vehicle spring, the combination with members mounted for relative movement, of a housing connected with one of said members and having outwardly extending projections formed thereon, a resilient spring extending through said housing, and separate sets of levers connecting the outer ends of the spring and projections with the other member.

3. In a vehicle spring, the combination with members mounted for relative movement, of a housing secured to one of said members and having outwardly extending projections formed thereon, a coil spring extending through the housing in approximately parallel relation to the projections and adjacent thereto, compression heads connected with the opposite ends of the spring, and separate sets of levers connecting the compression heads and projections with the other member.

4. In a vehicle spring, the combination with members mounted for relative movement, of a housing secured to one of said members and having outwardly extending projections formed thereon, a coil spring extending through the housing in approximately parallel relation to the projections and adjacent thereto, compression heads connected with the opposite ends of the spring, levers connecting the compression heads and projections with the other member, hangers connecting the projections and compression heads together, and hangers connecting the outer ends of the levers with the last mentioned movable member.

5. In a vehicle spring suspension, the combination with a vehicle frame, of a resilient spring associated with an axle, a housing for the spring, and levers operatively connecting the opposite ends of the spring and housing with the frame, one of said levers being shorter than the other to cause a differential in movement.

6. In a vehicle spring suspension, the combination with a vehicle frame, and an axle, of a housing connected with the axle, a resilient member associated with the housing, and levers on opposite sides of the axle and operatively connecting the opposite ends of the spring and housing with the frame, the lever on one side of the axle being relatively shorter than the other.

7. In a vehicle spring suspension, the combination with a vehicle frame, a housing associated with said frame, a resilient member associated with the housing, and separate sets of levers respectively connecting the housing and end portions of the resilient member with the frame.

8. In a vehicle spring suspension, the combination with a vehicle frame and an axle, of a housing connected with the axle, a resilient member associated with the housing, and separate sets of levers respectively connecting the opposite sides or ends of the housing and spring with the frame.

9. In a vehicle spring suspension, the combination with a vehicle frame and an axle, of a housing connected with the axle, a resilient member associated with the housing, levers pivotally connecting the opposite sides of the housing with the frame, and separate levers operatively connecting the opposite ends of the resilient member with the frame.

10. In a vehicle spring suspension, the combination with a vehicle frame and an axle, of a housing connected with the axle, a resilient member associated with the housing, levers pivotally connecting the opposite sides of the housing with the frame, separate levers operatively connecting the opposite ends of the resilient member with the frame, and hangers pivotally connecting the inner ends of the last-mentioned levers with the housing.

11. In a vehicle spring suspension, the combination of a vehicle frame, an axle, a spring housing connected with the axle, a spring extending into the housing, and levers operatively connecting the opposite ends of the spring and housing with the frame, one of said levers being relatively shorter than the other for causing a differential in the movements thereof.

12. In a vehicle spring suspension, the combination of a vehicle frame, an axle, a spring housing connected with the axle, a spring extending through the housing, and levers pivotally connected with the housing and operatively connecting the opposite ends of the spring and housing with the frame, the lever on one side of the axle being relatively shorter than on the other to cause a differential in the movements of said levers.

13. In a vehicle spring suspension, the combination with a vehicle frame and an axle, of a housing connected with the axle, a spring associated with the housing, and separate sets of levers respectively connecting the opposite sides or ends of the housing and spring with the frame, the levers on one side of the housing being relatively shorter than on the other side to cause a differential in the movements of said levers.

In testimony whereof I affix my signature.

CHARLES A. BLUHM.